(12) United States Patent
Freeman et al.

(10) Patent No.: US 7,667,732 B1
(45) Date of Patent: Feb. 23, 2010

(54) EVENT GENERATION AND CAMERA CLUSTER ANALYSIS OF MULTIPLE VIDEO STREAMS IN A PIPELINE ARCHITECTURE

(75) Inventors: J. Andrew Freeman, San Jose, CA (US); Robert P. Vallone, Palo Alto, CA (US); Stephen G. Russell, San Francisco, CA (US); Christian Pappas, San Francisco, CA (US); Stephen D. Fleischer, San Francisco, CA (US); Gordon T. Haupt, San Francisco, CA (US)

(73) Assignee: 3VR Security, Inc., San Francisco, CA (US)

( * ) Notice: Subject to any disclaimer, the term of this patent is extended or adjusted under 35 U.S.C. 154(b) by 1121 days.

(21) Appl. No.: 10/965,676

(22) Filed: Oct. 13, 2004

Related U.S. Application Data

(60) Provisional application No. 60/554,050, filed on Mar. 16, 2004.

(51) Int. Cl.
*H04N 7/18* (2006.01)

(52) U.S. Cl. .................. 348/143; 348/153; 348/159; 348/161; 348/154; 348/155; 348/699; 382/103; 382/165; 382/203

(58) Field of Classification Search ............ 348/143, 348/153, 159, 161, 154, 155, 699; 382/103, 382/165, 203
See application file for complete search history.

(56) References Cited

U.S. PATENT DOCUMENTS

| | | |
|---|---|---|
| 4,850,027 A | 7/1989 | Kimmel |
| 5,539,454 A | 7/1996 | Williams ............ 348/169 |

(Continued)

FOREIGN PATENT DOCUMENTS

EP   0 947 963 A1   6/1999

(Continued)

OTHER PUBLICATIONS

"Written Opinion of the International Preliminary Examining Authority" received in related International application No. PCT/US2005/008655.

(Continued)

*Primary Examiner*—Shawn An
(74) *Attorney, Agent, or Firm*—Hickman Palermo Truong & Becker LLP

(57) ABSTRACT

A pipeline architecture for analyzing multiple streams of video is embodied, in part, in a layer of application program interfaces (APIs) to each stage of processing. Buffer queuing is used between some stages, which helps moderate the load on the CPU(s). Through the layer of APIs, innumerable video analysis applications can access and analyze video data flowing through the pipeline, and can annotate portions of the video data (e.g., frames and groups of frames), based on the analyses performed, with information that describes the frame or group. These annotated frames and groups flow through the pipeline to subsequent stages of processing, at which increasingly complex analyses can be performed. At each stage, portions of the video data that are of little or no interest are removed from the video data. Ultimately, "events" are constructed and stored in a database, from which cross-event and historical analyses may be performed and associations with, and among, events may be made.

46 Claims, 3 Drawing Sheets

U.S. PATENT DOCUMENTS

| | | | |
|---|---|---|---|
| 5,862,342 | A | 1/1999 | Winter et al. |
| 5,875,304 | A | 2/1999 | Winter et al. |
| 6,031,573 | A | 2/2000 | MacCormack et al. |
| 6,144,797 | A | 11/2000 | MacCormack et al. |
| 6,188,381 | B1 | 2/2001 | van der Wal et al. ........ 345/112 |
| 6,636,222 | B1 | 10/2003 | Valmiki et al. |
| 6,646,676 | B1 | 11/2003 | DaGraca et al. |
| 6,791,603 | B2 | 9/2004 | Lazo et al. |
| 6,842,540 | B1 | 1/2005 | Okayama et al. |
| 6,978,047 | B2 * | 12/2005 | Montgomery ............... 382/235 |
| 2004/0117638 | A1 | 6/2004 | Monroe |

FOREIGN PATENT DOCUMENTS

WO　　WO 03/047258 A1 *　6/2003

OTHER PUBLICATIONS

Pending claims of related International application No. PCT/US2005/008655.

Notification of Transmittal of the International Search Report and the Written Opinion of the International Searching Authority, or the Declaration received in PCT International application No. PCT/US2005/008655.

Pending claims of PCT International application No. PCT/US2005/008655.

"Notification of Transmittal of the International Preliminary Report on Patentability" received in International application No. PCT/US2005/008655.

Current claims of PCT/US2005/008655.

"Notification of Transmittal of the International Preliminary Report on Patentability" received in International application No. PCT/US2005/008735.

Current claims of PCT/US2005/008735.

"Communication pursuant to Article 94(3) EPC" received in Application No. 05725674.5 dated Jun. 15, 2009, 2 pages.

Current Claims in Application No. 05725674.5, Jun. 2009, 9 pages.

* cited by examiner

EVENT GENERATION AND CAMERA CLUSTER ANALYSIS OF MULTIPLE VIDEO STREAMS IN A PIPELINE ARCHITECTURE

CROSS REFERENCE TO RELATED APPLICATIONS

This application claims the benefit of priority to U.S. Provisional Patent Application No. 60/554,050 filed on Mar. 16, 2004, entitled "Video Intelligence Platform"; and is related to U.S. patent application Ser. No. 10/965,687 filed on Oct. 13, 2004, entitled "Pipeline Architecture For Analyzing Multiple Video Streams"; and is related to U.S. patent application Ser. No. 10/965,682 filed on Oct. 13, 2004, entitled "Deep Frame Analysis Of Multiple Video Streams In A Pipeline Architecture"; and is related to U.S. patent application Ser. No. 10/965,675 filed on Oct. 13, 2004, entitled "Correlation Processing By Multiple Analyzers Of Video Streams At Stages Of A Pipeline Architecture"; and is related to U.S. patent application Ser. No. 10/964,977 filed on Oct. 13, 2004, entitled "Feed-Customized Processing Of Multiple Video Streams In A Pipeline Architecture"; the contents of all of which are incorporated by this reference in their entirety for all purposes as if fully disclosed herein.

FIELD OF THE INVENTION

The present invention relates to processing video streams, such as surveillance video, and, more specifically, to generation of events that describe the content of portions of the video streams and camera cluster analysis of multiple video streams in a pipeline architecture.

BACKGROUND

Analyzing the content of video streams to determine whether or not any interesting activities or objects are present is a resource-intensive operation. Software applications are used to analyze video streams, attempting to recognize certain activities or objects in the streams. For example, recognition applications exist for recognizing faces, gestures, vehicles, guns, motion, and the like. Often, such applications are used to analyze surveillance video streams for security purposes.

Some rudimentary analyses of a video stream, such as motion detection and gross object finding, can typically be performed quickly and, therefore, can be performed in real-time as the video stream is being captured and recorded. Compared to rudimentary analyses, more complex analyses of a video stream either (1) take more time with the same resources and, therefore, are performed on recorded video rather than in real-time, or (2) require more resources to perform.

Computing architectures used to execute recognition applications require significant computing resources in order to perform computationally complex operations, and significant storage resources in order to organize, save and access the video streams being analyzed. A typical approach to systems for analyzing video streams for recognition purposes is to design the systems for peak loads. Consequently, the system is provisioned with enough computational and storage resources to process video streams at peak load at all times, without the rate of processing falling behind the rate of video input into the system. For example, the system is provisioned with sufficient CPU, memory, bus and disk, to execute the more computationally complex analyses of the video streams. Furthermore, if such systems are designed to concurrently process multiple streams of video, the system must be provisioned with enough computational and storage resources to process multiple video streams at peak load at all times. Such architectures use the system resources inefficiently because at times when the system is not at peak load, a significant portion of the resources are idle. In addition, systems that are configured for handling peak loading are likely to be quite costly.

In order to minimize the amount of resources in a system, one approach is to provision a system with enough resources to perform the complex analyses, but only on one video stream or, perhaps, concurrently on a limited number of video streams. Another approach is to provision a system to concurrently analyze many streams of video, but only provide the capability to perform the more rudimentary analyses.

Based on the foregoing, there is room for improvement in systems for analyzing the content of video streams. Specifically, there is a need for techniques for efficiently and concurrently performing complex analyses on multiple video streams.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS OF THE INVENTION

Techniques are provided for analyzing video data that represents one or more streams of video. These techniques may be used, for example, for performing various resource-intensive and computationally complex recognition analyses of multiple surveillance videos at the same time.

The techniques described herein are embodied in a pipeline architecture that takes advantage of conventional multi-threaded processing. The pipeline architecture allows systems to be designed for average load rather than for peak load. The pipeline architecture is embodied, in part, in a layer of application program interfaces (APIs) to each of four stages of processing. Three stages of processing are referred to as "quick frame," "deep frame," and "cluster," each of which is described in detail herein. A fourth stage of processing is referred to as "database processing."

Buffer queuing is used between processing stages, which helps moderate the load on the CPU(s). Thus, as processing demand increases, the buffer fills up; and as demand decreases, the buffer is drained. That is, a given stage's input queue fills when the previous stage is sending more work than the given stage is able to process at that moment, and the input queue drains as the given stage catches up with the backlog, where the ability to process depends on the computational resources available to the given stage at that moment. Furthermore, multi-threaded processing is utilized to enable efficient use of hardware resources while analyzing video data representing multiple video streams in parallel, and to synchronize multiple concurrent analyses of the video data.

Through the layer of APIs, numerous video analysis applications can access and analyze video data that represents video streams flowing through the pipeline, and annotate portions of the video data (e.g., frames and groups of frames), based on the analyses performed, with information that describes the portion of the video data. These annotations flow through the pipeline, possibly along with corresponding frames or groups of frames, to subsequent stages of processing, at which increasingly complex analyses can be performed. Analyses performed at the various stages of the pipeline can take advantage of the analyses performed at prior stages of the pipeline through use of the information embodied in the annotations. At each stage of the pipeline, portions of the video streams determined to be of no interest to subsequent stages are removed from the video data, which reduces the processing requirements of the subsequent stages.

The pipeline architecture enables different and independent analyses of each of the video data associated with a video stream that entered the pipeline, which are flowing through the pipeline. The pipeline architecture also enables, at any stage of processing, correlation of, and evaluation of conditions on, results from multiple analyzer applications executing at that stage.

Ultimately, "events" are constructed and stored in a database, from which cross-event and historical analyses may be performed and associations with, and among, events may be made. Such events contain whatever information is relevant to describing the real-world activities or objects for which the event was constructed to describe. In addition, events may contain pointers to locations in persistent memory, e.g., a file store, at which the associated frames and/or groups of frames are stored. Hence, from an event stored in the database, the associated frames and/or groups of frames can be replayed for further human-based or application-based analyses.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Pipeline Architecture

Figure 1:
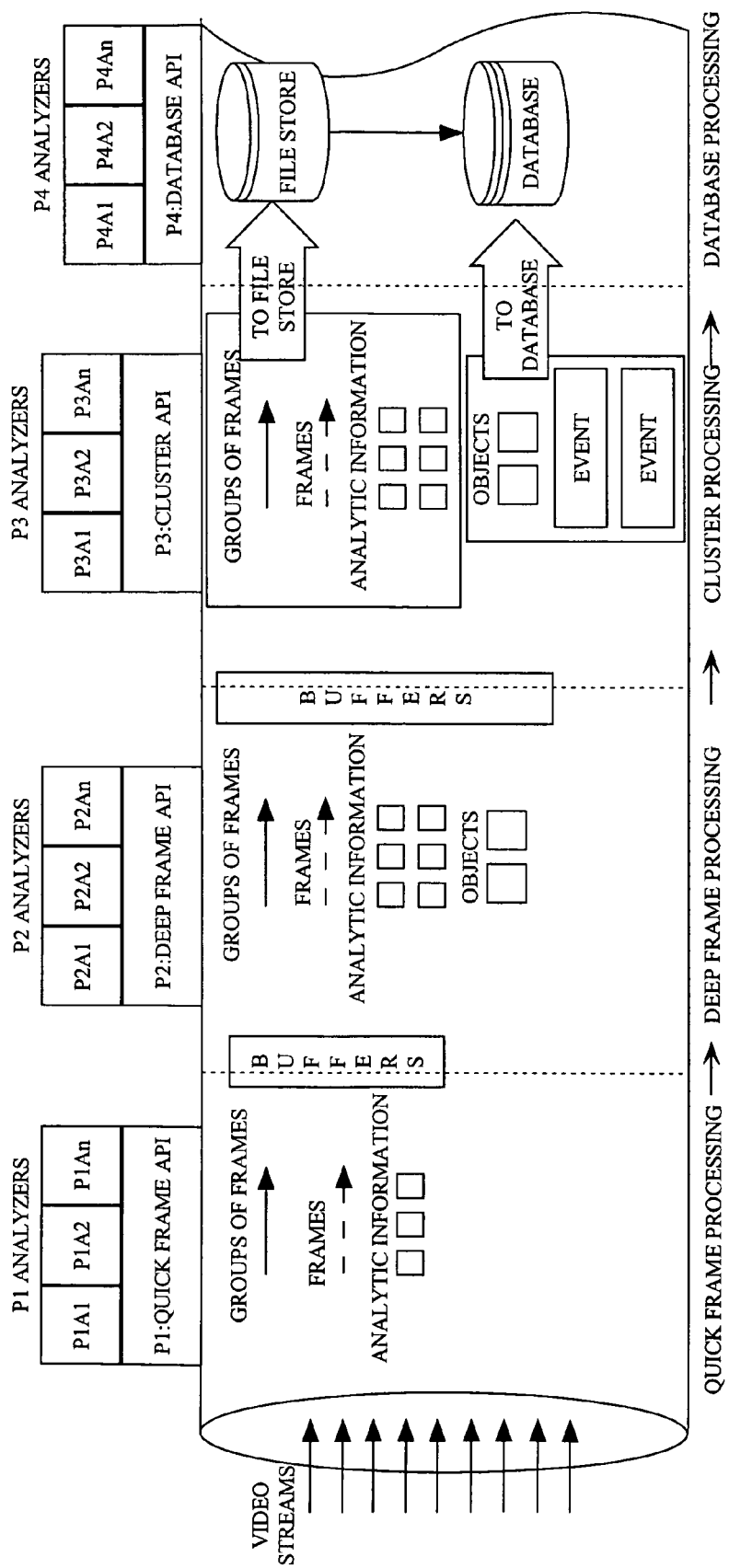
FIG. 1 is a block diagram that illustrates a video processing pipeline architecture, according to an embodiment of the invention.

FIG. 1 is a block diagram that illustrates a video processing pipeline architecture, according to an embodiment of the invention. The pipeline architecture enables analysis of video data that represents multiple input video streams, by multiple video analysis applications, at multiple stages of processing. Annotation of portions of video data (e.g., video frames and/or groups of frames) at each stage decreases the amount of video data that would need to be processed at subsequent stages, by providing some "informed intelligence" about what the video data represents, based on analysis. Filtering performed at each stage decreases the amount of video data that is passed to the next stage and, therefore, decreases the amount of video data that would need to be processed at subsequent stages, if at all. The annotations and the decrease in video data volume allows applications plugged into the pipeline at each successive stage of processing to perform more computationally complex analysis than at the prior stages of processing.

Generally, the pipeline architecture provides for exploitation of the capabilities of multi-processor, multi-thread hardware and operating systems and, utilizing controlled queuing, enables development of video analysis systems based on an average processing load rather than a peak processing load. In implementations of video analysis systems using the pipeline architecture, as much computing power as is necessary to perform the desired analyses across each stage of processing can be implemented at each stage of processing. Such a system may be implemented on one or more conventional computer systems, such as computer system 200 of FIG. 2. For example, a video analysis system for analyzing video data that represents multiple video streams may be implemented (a) on a single computer system having enough resources to concurrently process, on average, the video data at every stage of processing; or (b) on multiple computer systems where each computer system has only enough resources to process, on average, the video data at a single respective stage of processing; or (c) on multiple computer systems where the combined resources of multiple computer systems is sufficient to process, on average, the video data at a single stage of processing. There are no limitations on how the computing resources of a system implementing the pipeline architecture may be configured. Therefore, such a system can scale to an arbitrarily large capacity.

The pipeline architecture ("pipeline") enables concurrent "on-the-fly" analysis of video data representing multiple input video streams. For example, video data representing video streams from each of multiple video cameras can be processed via the pipeline. In one embodiment, the pipeline comprises four different successive stages of processing: (1) quick frame processing; (2) deep frame processing; (3) cluster processing; and (4) database processing. Due to the nature of the pipeline, applications plugged into the pipeline, via application program interfaces (APIs) associated with each respective stage, can perform increasingly more complex on-the-fly analyses at each successive stage of processing.

"On-the-fly" analysis, as used herein, refers to analysis operations that are executed sufficiently fast such that the operations do not fall behind the rate at which the video data flow through the pipeline, i.e., the analysis processes do not exceed a predetermined maximum delay, such as a delay that is relative to the maximum capacity of a buffer in which the video data is buffered for processing. On-the-fly analysis can include real-time analysis in which the processing keeps up with the rate at which the video data flows into a given stage of the pipeline, such as at the quick frame stage. Further, on-the-fly analysis can include near-real-time analysis, in which, over time, the processing keeps up with the rate at which the video data enters into a given stage of the pipeline via a buffer, such as at the deep frame and cluster stages.

Generally, as the video data flows down the pipeline, (1) portions of the video data that are considered uninteresting are removed from the video data, thereby reducing the size of the video data that flows further down the pipeline; (2) portions of the video data that are considered interesting to an application at a given stage are analyzed, with a goal of identifying interesting features, activities, objects, and the like; and (3) (a) the analyzed portions of the video data are annotated by the applications, with information that describes what the applications identified as interesting in that portion of the video data (e.g., by quick frame processing), and/or (b) "objects" are generated by the applications based on respective analyses (e.g., by deep frame processing), and/or (c) "events" are constructed by the applications based on respective analyses (e.g., by cluster processing), all of which flow to the respective subsequent stage.

"Video data" generally refers to compressed or uncompressed digital representations of video, or frames, or groups of frames (e.g., fragments of video), or images, or information derived from analysis of video, frames or images, or to any other representation of visual information, known now or developed in the future.

A "frame" refers to a digital representation of an image captured by a camera at a given moment. A group of frames is, generally, a digital representation of one or more finite durations of video from a single source. For example, a group of frames may include a group of contiguous frames, or may include multiple non-contiguous fragments of video. However, in practice, a group of frames may simply be information that describes one or more finite durations of video from a single source, with or without the associated video fragment (s). For example, a group of frames may be information that represents passage of time in which nothing of interest occurred and, therefore, for which the associated video fragment was discarded and not passed further down the pipeline.

An "object" is a collection of related entities that flow together down the pipeline, such as analytic information that describes a frame with or without the associated frame, or information that describes the a group of frames with or without the associated video fragment.

An "event" is constructed from information extracted from objects, may refer to associated frames and/or groups of frames, and contains whatever information is relevant to describing the real-world activities or objects for which the event was constructed to describe, which may be referred to as the "content" of the frame and/or group of frames. Events are stored in a data repository, such as a database, and objects may be stored in the data repository if not "consumed" by inclusion into one or more events. The pipeline provides for trans-data structure analyses, such as analyses across video frames, across groups of frames, across objects, and across cameras. Hence, such trans-data structure analyses provide for construction of events across time and across space (e.g., in the construction of events based on a cluster of cameras, as described hereafter).

Quick frame processing is lightweight processing (i.e., not relatively resource-intensive and computationally complex) performed in real-time as the video streams flow into the pipeline. Deep frame and cluster processing are heavier weight processing (i.e., relatively resource-intensive and computationally complex) and, though they are still performed on-the-fly, may not be in real-time. Video data that represents video streams, along with other information about the video streams (e.g., annotations, objects), are queued in buffers between quick frame and deep frame processing, and in other buffers between deep frame and cluster processing. For example, a buffer between quick frame and deep frame processing may contain one or more of (1) a group of frames, (2) some annotation information about the group of frames (e.g., start time, duration, camera identifier), (3) zero or more frames associated with the group of frames, (4) some frame annotation information (e.g., frame number relative to the group of frames, quick frame analysis results, etc.). With sufficient computing resources, and through use of the buffers, the deep frame and cluster processing can be performed on-the-fly, rather than time delayed.

Stage 1: Quick Frame Processing

Stage 1 of the pipeline processing ("P1") is referred to as "quick frame" processing. Quick frame processing is performed in real-time (on-the-fly with no time delay greater than the rate at which the video data is entering the stage) as multiple video streams enter the pipeline. Any number of video analysis applications (referred to in FIG. 1 as P1 Analyzers, P1A1, P1A2, P1An) can access the video feeds for quick frame processing, through a quick frame API. Various applications tailored to recognize and identify certain types of content (e.g., activities, objects, colors, sounds, and the like) may plug into the pipeline via the quick frame API, to perform fast lightweight operations, such as noise reduction, motion detection, gross object finding, object tracking, frame area filtering, and the like. Quick frame applications may be the same as, or different than, deep frame applications and cluster applications.

In one embodiment, multi-threaded processing is utilized at the quick frame processing stage, to enable multiple P1 analyzers to concurrently analyze multiple video data, that each represents a video stream, flowing down the pipeline. In one embodiment, one processing thread is allocated for each of the multiple video data. Implementing one thread per video data avoids having to deconstruct each stream, to assign the work associated with each portion of the stream to various threads, and to perform time-sequenced reconstruction of the streams. Such deconstruction and reconstruction would be required if multiple threads processed video data representing a single stream. This approach to processing the video data at the quick frame stage furthers the goal of lightweight, real-time processing of the video at this stage. As is described hereafter, more complex, almost-real-time, analyses of the video data can be performed at subsequent stages of processing, such as at the deep frame stage of processing.

In one embodiment, the input to quick frame processing includes (1) analog or digital video streams, such as MPEGs; and (2) frame difference information, which identifies differences in pixels, or bits, in adjacent frames of video. Motion can be detected from frame difference information, for example, from a video capture system. Alternatively, the frame difference information may be generated by a P1 analyzer rather than input into the pipeline.

In one embodiment, a P1 analyzer analyzes and intelligently divides the video streams coming into the pipeline into groups of frames in which the frames have some similar characteristic. For example, video data may be divided into groups of contiguous frames that contain motion. For another example, video data may be divided into groups of frames based on a duration, space used, and/or number of interesting frames contained therein. Further, one or more P1 analyzers identify and analyze frames and/or groups of frames of interest in an attempt to at least begin determining the real-life content of such frames. Quick frame processing involves analysis of relatively simple, single frame features. Quick frame processing may identify, for example, frame regions with motion, shapes, and the like.

In one embodiment, the output from the quick frame processing includes selected frames, annotated with relatively simple information about the frame, e.g., information about what is the real-life content of that frame and, perhaps, a reference to a group of frames to which the frame belongs. Annotated information (referred to at times herein as "analytic information") can be associated with any frame by any, or all, of the P1 analyzer applications that analyze the video data via the quick frame API. The analytic information that is annotated in association with a particular frame by a particular P1 analyzer application is based on the results of analysis performed on the frame by the particular analyzer. Analytic information may be correlated with, but maintained separate from, associated frame data. Alternatively, analytic information may be appended, in any manner, to the actual associated frame data.

In one embodiment, in addition to the annotated frames, the output from the quick frame processing includes selected groups of frames represented by the video data. As discussed, a group of frames is, or is about, a digital representation of a finite duration of video from a single source, e.g., a time-continuous fragment of video or information about a fragment of video. A group of frames is associated with the frames that are contained in the group of frames, if any, and identifies the group's interval, such as the group's start time and stop time, start time and duration, or stop time and duration. A group of frames may contain audio information. As discussed, a group of frames may actually contain zero frames of video. For example, a group of frames may contain only the audio track from a video stream for a certain portion of time, unassociated with any frames; or a group of frames may refer to a frame back in the past prior to the start time of the group, at which motion ended.

Buffer Queue

The output from the quick frame processing stage is queued in buffers, for access and analysis by analyzer applications executing at the deep frame processing stage. Hence, subsequent processing is not necessarily in real-time, but is on-the-fly and may be, in some instances, very close to real-time.

A queue is a sequence of work objects that are organized for processing, for example, in first-in, first-out (FIFO) order. In one embodiment, the queue between the quick frame and deep frame stages serves to buffer any annotated frames, group of frames, associated annotations and, possibly, unaltered video data representing streams of video that were input to the pipeline. A buffer is a data area shared by hardware devices or program processes that may operate at different speeds or with different sets of priorities. The buffer allows each device or process to operate without being held up by the other. For example, the pipeline buffers allow multiple processing threads to operate on the video streams independently of the other threads. However, the queue may be controlled for synchronization and workload management purposes.

In one embodiment, each video data (which corresponds to a separate video stream) flowing down the pipeline is associated with a separate buffer. In a related embodiment, the buffers between the quick frame processing stage and the deep frame processing stage are FIFO buffers. Using conventional operating system threading techniques, a processor can use each of multiple processing threads and the thread's associated resources to process information from any, and all, of the buffers, and can change the use of a thread's resources from processing information in one buffer to processing information in another different buffer.

Use of the buffers enables on-the-fly processing in which, as the processing demand rises, the buffers fill up, and as the demand recedes, the buffers are drained. With sufficient processing resources, the video data does not need to be stored persistently and later retrieved for processing. Consequently, the system operates at a stable level of load and efficiently utilizes the system resources.

Stage 2: Deep Frame Processing

Stage 2 of the pipeline processing ("P2") is referred to as "deep frame" processing. Any number of video analysis applications (referred to in FIG. 1 as P2 Analyzers, P2A1, P2A2, P2An) can access the video data from the buffers that reside between the quick frame and deep frame stages, through a deep frame API. Various applications tailored to recognize and identify certain types of content (e.g., activities, objects, colors, sounds, and the like) may plug into the pipeline via the deep frame API, to perform more computationally complex and resource-intensive analyses operations than with quick frame processing. For example, deep frame analyses of the video data may include face finding, license plate recognition, complex object detection (e.g., gun finding), feature extraction, and the like. Deep frame applications may be the same as, or different than, quick frame applications and cluster applications.

Because deep frame processing is more computationally complex than quick frame processing, deep frame processing cannot be performed in real-time on the volume of video information initially received by the pipeline. However, deep frame processing can be performed on-the-fly at the deep frame stage of the pipeline, in part because the volume of video information has been reduced by filtering performed at the quick frame stage of the pipeline. In addition, examination of annotation information about a frame or group of frames, rather than analysis of the frame or group of frames, provides for a quick decision regarding whether to further analyze the video data.

In one embodiment, multi-threaded processing is utilized at the deep frame processing stage, to enable multiple P2 analyzers to concurrently analyze multiple video data, that each represents at least a portion of a video stream, flowing down the pipeline. Use of the buffers between the real-time quick frame processing stage and the deep frame processing stage provides for efficient utilization of the system resources, by allowing the deep frame processing to be performed at a constant rate in spite of large fluctuations in the volume of filtered video data coming from the quick frame stage. Deep frame processing does not maintain a one thread per video stream approach, as with quick frame processing. Rather, the processor(s) is free to apply the threads' respective system resources wherever needed, to enable multiple parallel analyses of multiple video streams by multiple P2 analyzer applications.

In one embodiment, every analyzer is allowed to access and analyze a given frame before any of the analyzers are allowed to access and analyze the next frame. Hence, synchronization of the processing of the multiple video streams by multiple P2 analyzers at the deep frame stage is maintained and, therefore, the system resources can be applied to whichever streams are requiring more resources to process than other streams. Consequently, video analysis systems utilizing the pipeline architecture can be developed based on an average processing load rather than on a peak processing load at all times.

In one embodiment, deep frame processing still involves processing of video data that represent singular video streams at single points in time, such as with quick frame processing, rather than cross-stream, cross-camera analyses over time (which is provided at Stage 3: Cluster Processing). The P2 analyzers access the buffers to read one or more of frames, groups of frames and/or annotations associated with the frames and/or groups. The P2 analyzers examine the groups, frames, and/or analytic information to determine if the groups and/or frames are interesting enough to perform additional analyses.

If any P2 analyzer finds particular frames or groups of frames to be of interest, based on the annotated analytic information and/or based on the frame or group itself, then the analyzer determines what type of analysis to perform on the frame or group of frames and creates objects based thereon. For example, a P2 analyzer may create a motion object that includes information that characterizes that motion occurred in a given camera view (i.e., a given video stream) started at time X and ended at time Y. Each P2 analyzer application is allowed to (1) as needed, look at each frame and/or group of frames, and associated analytic information, from the buffer, (2) annotate a frame or group of frames further with additional analytic information based on analyses performed by the analyzer, and (3) create objects that contain information that characterizes the content of one or more frames and/or one or more groups of frames, based on analyses performed by the analyzer, for sending further down the pipeline to subsequent processing stages.

Objects created at the deep frame processing stage typically contain a pointer to relevant one or more frames, or frames from groups of frames, and contain the additional information about the frame or groups of frames on which the object is based. All the P2 analyzers share the information from the buffer, and each P2 analyzer is allowed to create independent objects relative to the type of analysis a given analyzer performs (e.g., face recognition analyzer, license plate finding analyzer, audio analyzer, etc.) and, thus, the type of content from a frame or group of frames that the analyzer recognized and/or identified. Sequences of objects are output from the deep frame processing stage and, in one embodiment, are queued in a buffer between the deep frame processing stage and the cluster processing stage.

If a given groups of frames or frame is found by all P2 analyzers to be of no interest to the deep frame or subsequent stages of processing, then the groups of frames or frame is removed from the information flowing down the pipeline so that the information flowing down the pipeline is reduced. Thus, filtering performed at the deep frame stage of the pipeline further reduces the volume of video data flowing down the pipeline. In one embodiment, a frame flows through to the next stage of the pipeline if an object that is output from the deep frame processing stage references the frame. However, frames are not stored redundantly, in a buffer or in persistent storage, if multiple objects reference the frame. In one embodiment, a group of frames flows through to the next stage of the pipeline if an object that is output from the deep frame processing stage references the group of frames, even if the group's constituent frames are not necessarily needed downstream.

Stage 3: Cluster Processing

Stage 3 of the pipeline processing ("P3") is referred to as "cluster" processing. Any number of video analysis applications (referred to in FIG. 1 as P3 Analyzers, P3A1, P3A2, P3An) can access the video data and other information from the buffers that are between the deep frame and cluster stages, through a cluster API. Various applications tailored to recognize and identify certain types of content (e.g., activities, objects, colors, sounds, and the like) may plug into the pipeline via the cluster API, to perform analyses on the video data across time (i.e., across frames or groups of frames in the same stream) and across cameras (i.e., within a "cluster" of cameras that, for analysis purposes, are treated as an entity). For example, events based on analyses of the video streams at the cluster stage of processing may include various tailored analyses and construction of associated events, such as person or face events, alert generation events, externally triggered events, and the like. Cluster applications may be the same as, or different than, quick frame applications and deep frame applications.

An event that is constructed based on cluster analysis of video data from one or more cameras (a "cluster" of cameras) is referred to as a "cluster event." A cluster may actually contain only one camera, for which processing designed for multiple cameras is still be appropriate. Cluster events provide information to intelligently describe what actually occurred in the view of the associated cluster of cameras, such as "what happened in a building lobby" rather than "what happened in view of camera X," where camera X is only one of a plurality of cameras operating in the lobby. For example, a cluster event may describe that a person walked through a building lobby, through a door, and down a hallway, based on the video data from a cluster of cameras whose collective view covers the lobby, the door and the hallway.

Events, either cluster events or non-cluster events, are constructed by P3 analyzers at the cluster stage of processing, based on video data received from the deep frame stage and/or information extracted from objects output by the deep frame analyzers. The pipeline outputs events, from the cluster stage, that are constructed by P3 analyzers and stores the events in a database. In one embodiment, each event is stored as a row in a database table, where each row contains (1) information that describes whatever the analyzer determined about what occurred in the area observed (i.e., the content of the video frames or snippets), for which the event was constructed, and (2) references to the frames or groups of frames that are associated with the event, if desired or necessary, including pointers to the frames and/or groups of frames in a file store. The P3 analyzer applications determine what information to store in the database in association with an event.

The frames and groups of frames that remain in the stream after the cluster processing and event construction, such as the frames and groups of frames that are referenced in any objects or events that were output from the cluster stage, are stored in a file store. The objects that are used to construct events may be "consumed" by cluster processing and, therefore, not stored or processed further. However, in one embodiment, some objects may also be stored in the database if all the objects' constituent information is not extracted and used in the construction of an event.

Similar to previous processing stages of the pipeline, in one embodiment, multi-threaded processing is utilized at the cluster processing stage, to enable multiple P3 analyzers to concurrently analyze multiple video data, that each represents at least a portion of a video stream, flowing down the pipeline. Use of buffers between the deep frame processing stage and the cluster processing stage provides for efficient utilization of the system resources. Cluster processing does not maintain a one thread per video stream approach, as with quick frame processing. Rather, the multiple processing threads are free to apply their respective system resources wherever needed, to enable multiple parallel analyses of multiple video streams by multiple P3 analyzer applications.

In one embodiment, objects output from deep frame processing are queued in the buffers such that the objects are processed in time synchronous order across all of the video streams. Every P3 analyzer is allowed to access and analyze a given frame or object before any of the analyzers are allowed to access and analyze the next frame or object. Hence, processing of the objects associated with video streams from each of the cameras in a camera cluster is performed in lockstep. That is, processing of multiple video streams is synchronized within a cluster of cameras from which the multiple streams originated. Therefore, system resources can again be applied to whatever video data needs processing, based on the demand of the analyzer applications.

Events constructed at the cluster stage of processing can be constructed incrementally. Thus, an event can be constructed based on cluster processing, stored in the database, and revised at a later time. For example, activities that are related to an event may occur later than when the original event was constructed, and an analyzer might want to add the later activity to the event information.

At the cluster stage of processing, events can be defined by, constructed based on, or triggered by, events external to the associated video streams. For example, activation of a fire alarm in a monitored building may spur a request from a user or application to begin construction of a "fire alarm" event, in order to observe what happens in the building subsequent to activation of the fire alarm, and/or what happened in the building prior to activation of the fire alarm. For another example, activation of a fire alarm may trigger a P3 analyzer that is monitoring the building to automatically begin construction of a "fire alarm" event, in order to observe happenings in the building around the time of the fire alarm.

Stage 4: Database Processing

Further analysis and reasoning can be applied to events, or combinations of events, that are stored in the database. From a database record containing pointers to the location in the file store at which frames and groups of frames are stored, the associated frames and groups of frames can be replayed and reviewed, for example, by a user via a display monitor or by database stage analyzer applications via a database API.

Stage 4 of the pipeline processing ("P4") is referred to as database processing. Any number of video analysis applications (referred to in FIG. 1 as P4 Analyzers, P4A1, P4A2, P4An) can access event records from the database for database processing, through the database API. Unlike the analyzers at Stages 1, 2, and 3, the analysis performed at Stage 4 is not necessarily performed on-the-fly. Various applications tailored to perform complex analysis across events and across clusters may plug into the pipeline via the database API, to perform analyses such as historical analyses, person/place/time reports, object/person associations and identification, and the like.

As discussed, events can be constructed incrementally. For example, a P3 analyzer may initially construct a cluster event to describe that a person walked down a hallway and stopped near a trash receptacle before moving down the hallway, and this event is stored in the database. Later, the cluster of cameras views a fire burning in the trash receptacle. Consequently, a P4 analyzer can retrieve the event from the database and add information to describe that a fire occurred in the trash receptacle shortly after the person stopped at the receptacle. The period of time spanned by an event is not limited.

Partitioning of File Store

As discussed, frames and snippets that are referenced in objects or events stored in the database and, therefore, have traveled all the way through the pipeline, are stored in one or more file stores. The nature of the file storage mechanism(s) is unimportant and may vary from implementation to implementation.

In one embodiment, the content of the file store(s) is partitioned, physically or logically. For example, the content could be partitioned by month, or by year. Therefore, if the video analysis system is limited as to how much data the system can provide access to at any point in time, then a file store could be implemented for each month of content, and not all of the file stores need to be on-line and available at all times. The database in which the events are stored should be on-line and available at all times. If some data stored in the file store(s) is moved off-line, then the database may not be able to immediately access the off-line data associated with an event. However, the database may recognize the need for the off-line data and make an appropriate request that the data be made available.

Feed-Customized Processing

The video processing pipeline architecture described herein provides for multiple parallel analyses of multiple video streams, where each video stream (i.e., "feed") originates from a respective video camera. The pipeline architecture allows the processing performed on the video data of each individual feed to be highly customized. The type and amount of processing performed on the various feeds may differ from the type and amount of processing performed on the other feeds within the same pipeline.

Non-limiting examples of uses of per-feed customized processing include: (1) choosing which analyzer application(s) to analyze particular video data; (2) choosing which analysis or analyses to perform, by a particular analyzer application, on particular video data (e.g., face recognition for one stream and license plate recognition for another stream); and (3) "tuning" an analyzer for particular video streams by choosing a level of analysis to perform on particular video data, for non-limiting examples, (a) outdoor versus indoor analysis, (b) applying different thresholds regarding whether or not to annotate a frame or group of frames, create an object, construct an event, etc. Thresholds may or may not be related to the particular type of content that an analyzer application is trying to identify from a frame or group of frames. For example, thresholds may be temporal-based, e.g., relative to a time of day, a day of the week or month, and the like, at which the video was captured. Per-feed customized processing within a type of analysis can vary from stage to stage. For example, for a given analyzer, a threshold of how much motion must be observed to trigger creation of a motion object from the deep frame stage may be different than a threshold regarding how much motion must be observed to trigger construction of a motion event from the cluster stage.

Similar to per-feed customized processing, the pipeline architecture enables use of various, and variable, analysis settings and configurations, on a per-cluster basis (referred to as "per-cluster customized processing"). Unlike per-feed customized processing, per-cluster customized processing is applicable only at the cluster and database stages of processing. The non-limiting examples of per-feed customized processing previously described also serve as non-limiting examples of per-cluster customized processing. However, per-cluster settings are applicable to particular camera clusters rather than to particular cameras.

Correlation Across Analyzers

The pipeline architecture enables the use of correlation processing among different analyzer applications at any of the stages of processing along the pipeline. Correlation processing involves establishing and evaluating rules that apply to the results of more than one analyzer at a given stage of processing. The rules contain conditions based on the results of each of the relevant analyzers, and evaluation of the conditions are used to make decisions, such as whether or not to annotate a particular frame or group of frames, create an object, or construct an event. For example, if one analyzer determines that a frame "might" contain a person (which, for example, could be represented with a numeric indicator of a confidence level) and if another analyzer determines that the frame "might" contain a gun, neither determination of which is enough for the respective analyzers to create an object based thereon, then a conditional correlation rule may be applied to those discrete determinations to determine that an object should be created for that frame and passed down the pipeline for further processing.

Correlation processing may be implemented, for example, using a correlation analyzer application that reviews the results of the analyzers on which conditions are established, evaluates the conditions based on the results, and makes a decision based on the whether or not the conditions are met.

The types of rules that may be used in correlation processing are not limited, and may vary from implementation to implementation. For example, correlation processing can involve applying specified weights to the results of the analyzers on which conditions are established, for input to a condition based on the weighted results. For another example, correlation processing can involve combining results of analyzers, for input to a condition based on the combined results. For yet another example of correlation processing, results of one or more analyzers may be reviewed in light of an external event, such as activation of a fire alarm, to decide whether or not to construct an "event" for the database (e.g., at the cluster stage of processing).

Hardware Overview

General Computer System

Figure 2:
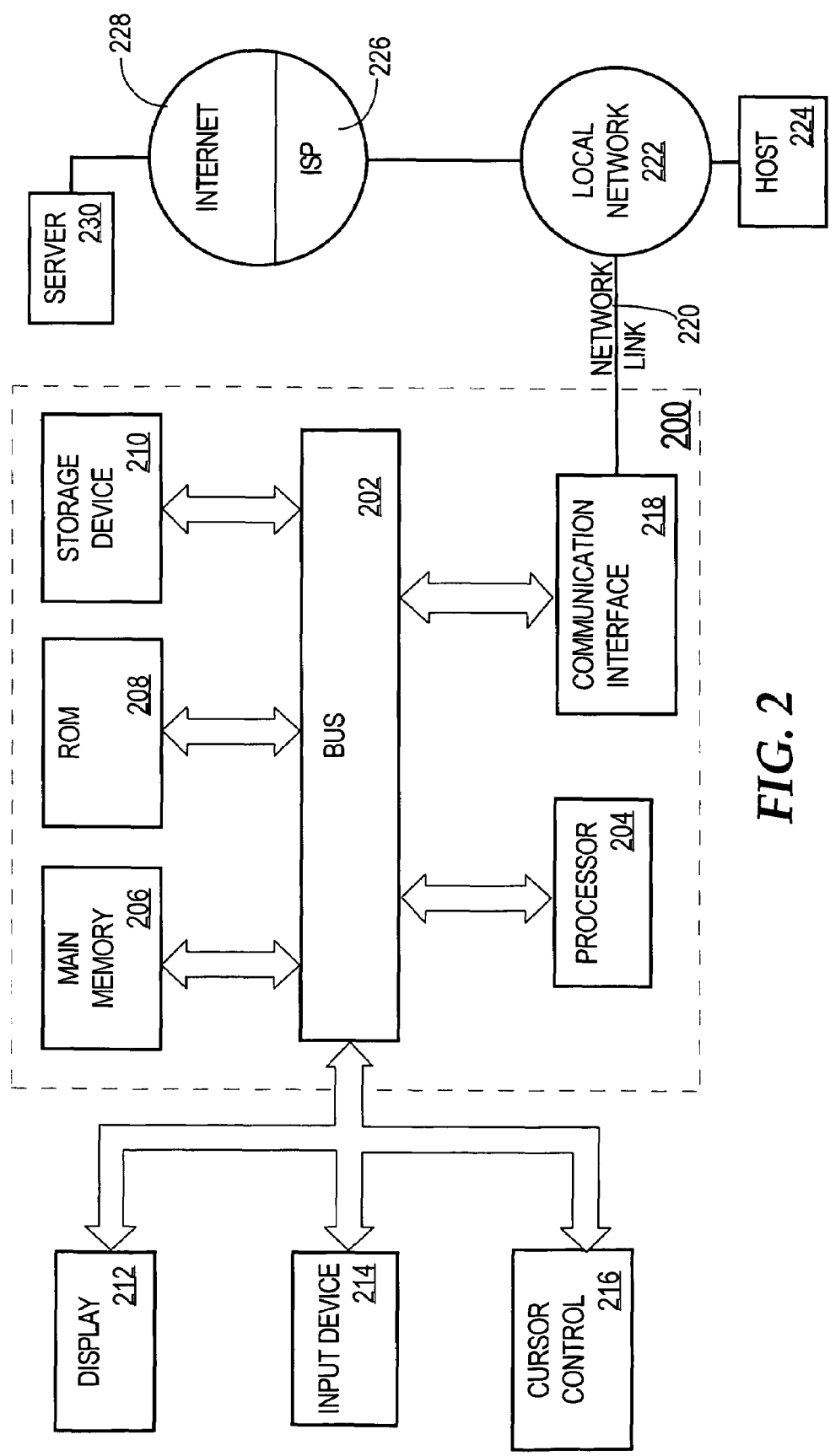
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

Tailored Computer System

Figure 3:
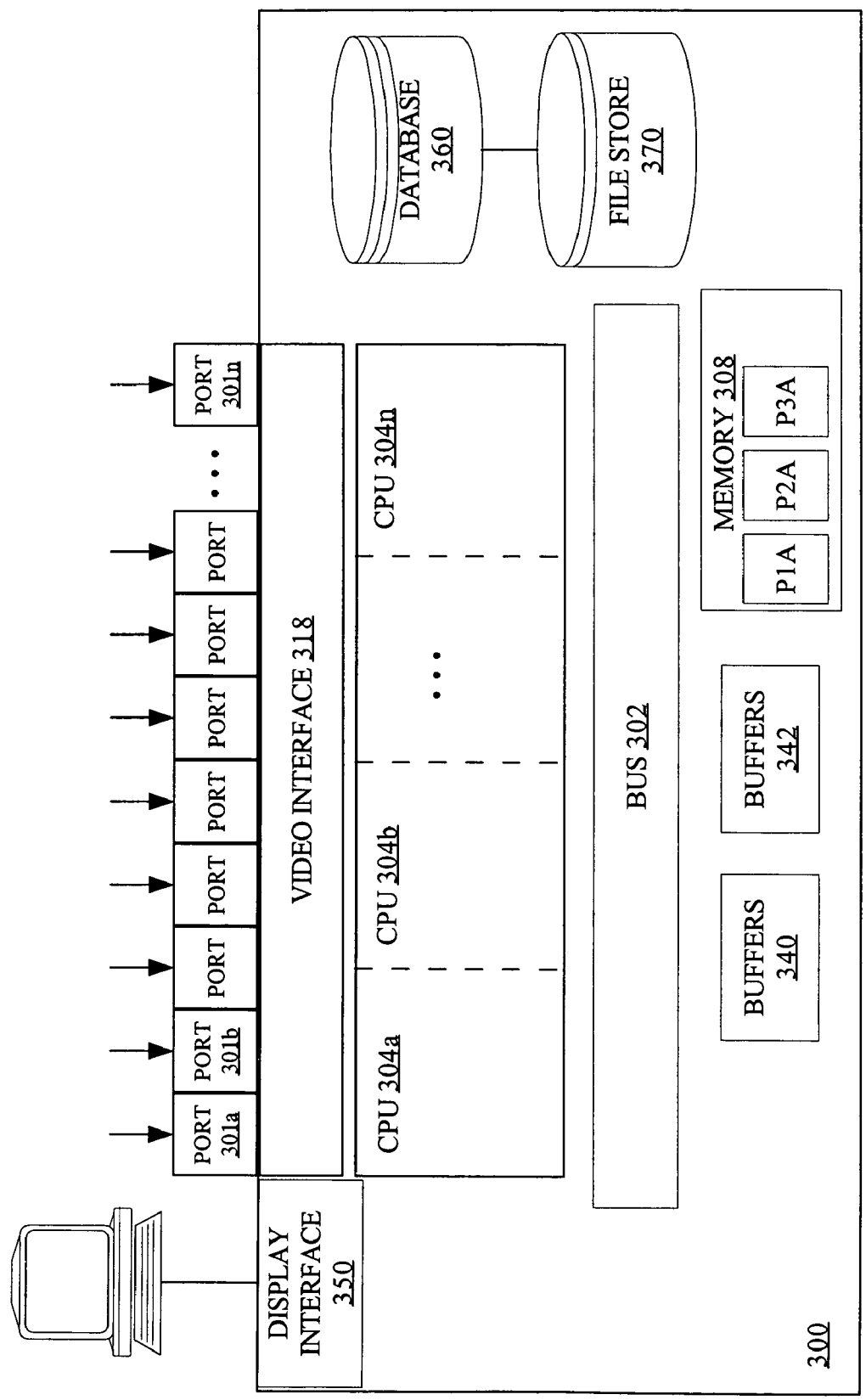
FIG. 3 is a block diagram that illustrates a simplified video analysis system on which an embodiment of the invention may be implemented.

FIG. 3 is a block diagram that illustrates a simplified video analysis system 300 on which an embodiment of the invention may be implemented. Video analysis system 300 is a variation of computer system 200 of FIG. 2, in which components depicted in system 300 perform similarly to like components depicted in system 200. FIG. 3 illustrates that all of the functionality provided by the pipeline architecture described herein, may be implemented in one machine. However, implementation of the pipeline architecture is not limited to implementation on one machine and, therefore, the functionality provided by the pipeline architecture may be implemented on a plurality of communicatively coupled machines. The pipeline architecture provides flexibility and scalability as to how any given implementation of a video analysis system, based on the pipeline architecture, may be configured in hardware.

FIG. 3 is a simplified depiction of a system on which an embodiment may be implemented. Therefore, the absence from FIG. 3 of certain components that are depicted in FIG. 2 is not meant to convey that those certain components are not configured in system 300. Rather, such components are left out of FIG. 3 simply for purposes of clarity.

System 300 includes a plurality of ports 301*a*-301*n* for receiving video streams, where the value of n is arbitrary. That is, a video analysis system implementing the pipeline architecture can be configured with any number of ports for receiving any number of video streams. Ports 301*a*-301*n* are communicatively coupled to one or more video interface 318, for initial processing and triage of the incoming video streams. In addition, system 300 includes a workstation interface 350 for processing communications to and from an external workstation with accompanying input device(s).

Similar to computer system 200, video analysis system 300 includes a bus 302 and one or more CPUs 304*a*-304*n*, where the value of n is arbitrary. System 300 may be configured with any number of CPUs of similar or varying processing capacity. For example, system 300 may contain a single CPU, or may contain a different CPU for each of the quick frame, deep frame, cluster, and database stages of processing, with processing power tuned for the respective stages of processing. The various components of system 300 depicted in FIG. 3 are all communicatively coupled via bus 302, and may be implemented using conventional hardware components.

As described, the pipeline architecture utilizes buffers between the quick frame and deep frame stages of processing, and between the deep frame and cluster stages of processing. Therefore, system 300 is configured with buffers 340 and buffers 342 for the buffering of the video streams and related information (e.g., frames, snippets, annotations, objects), as described herein. In one embodiment, buffers 340 include a buffer for each of the video streams flowing from the quick frame stage to the deep frame stage, and buffers 342 include a buffer for each of the video streams flowing from the deep frame stage to the cluster stage.

System 300 includes memory 308, which collectively depicts all types of memory with which system 300 may be configured, such as main memory, ROM, and hard disk storage. Hence, memory 308 may be used to store analyzer applications, depicted as P1A, P2A and P3A (see P1A1-P1An, P2A1-P2An, P3A1-P3An and P4A1-P4An of FIG. 1). System 300 may be configured with enough memory 308 to store as many analyzer applications as desired, for all stages of processing, which interface with the pipeline (and, therefore, the video streams) through respective APIs. Alternatively, the analyzer applications may be stored on an external storage device and loaded into the system 300 memory for execution, when necessary, for performing analyses of the video streams.

System 300 includes a database 370, for storage of events based on analyses of the video streams, as described herein. Database 370 depicts both the database in which data is organized and stored, as well as a database management system that facilitates access to data in the database. Alternatively, database 370 may be configured external to, but communicatively coupled with, system 300.

System 300 includes a file store 370, for storage of portions of video streams (e.g., frames, snippets) that are referenced in objects and/or events that are stored in database 360, as described herein. As with database 360, file store 370 may alternatively be configured external to, but communicatively coupled with, system 300.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A volatile or non-volatile storage device storing instructions which, when executed by one or more processors, cause:

receiving, from a first video analyzer application, a first call to read, from a memory, first analytic information that is associated with first video data;

wherein the first video data includes (a) first frames that correspond to a first video stream and (b) the first analytic information;

wherein the first analytic information is (i) about the content of the first frames and describes the content of the first frames (ii) based on prior analysis of the first frames, and (iii) different than the first frames;

in response to the first call, providing the first analytic information to the first video analyzer application to allow the first video analyzer application to perform a first set of one or more analysis operations on the first analytic information;

receiving, from the first video analyzer application, a second call to read, from a second memory, second analytic information that is associated with second video data;

wherein the second video data includes (a) one or more second frames that correspond to a second video stream and (b) the second analytic information;

wherein the second analytic information is (i) about the content of the second frames and describes the content of the second frames, (ii) based on prior analysis of the second frames, and (iii) different than the second frames;

wherein the second frames are different than the first frames;

in response to the second call, providing the second analytic information to the first video analyzer application to allow;

the first video analyzer application to perform a second set of one or more analysis operations on the second analytic information, and the first video analyzer application to construct event information about the content of the first frames and the second frames based on both the first analytic information and the second analytic information;

wherein the second analytic information differs from the first analytic information.

2. The volatile or non-volatile storage device of claim 1, wherein:

the one or more first frames originated from a first camera at a first time, and the one or more second frames originated from the first camera at a second time that is different than the first time.

3. The volatile or non-volatile storage device of claim 1, wherein:

the one or more first frames originated from a first camera, and the one or more second frames originated from a second camera that is different than the first camera.

4. The volatile or non-volatile storage device of claim 1, wherein the instructions include additional instructions which, when executed by the one or more processors, further cause storing the event information in a data repository.

5. The volatile or non-volatile storage device of claim 4, wherein the step of providing the second analytic information includes providing the first analytic information to the first video analyzer application to allow the third video analyzer application to store the event information in one or more database tables.

6. The volatile or non-volatile storage device of claim 4, wherein the event information stored in the data repository is first event information, and the instructions include additional instructions which, when executed by the one or more processors, further cause providing the first event information, from the data repository, to the first video analyzer application to allow the first video analyzer application to:

add second event information to the first event information, wherein the second event information further describes the content of the one or more first and second frames, and store the first and second event information together as an entry in the data repository.

7. The volatile or non-volatile storage device of claim 6, wherein the step of providing the first event information includes providing the first event information to the first video analyzer application to allow the first video analyzer application to construct the second event information in response to occurrence of an event that is external to the first and second video data.

8. The volatile or non-volatile storage device of claim 1, wherein the instructions include additional instructions which, when executed by the one or more processors, further cause:

providing the one or more first frames to the first video analyzer application to allow the first video analyzer application to perform a third set of one or more analysis operations on the one or more first frames; and providing the one or more second frames to the first video analyzer application to allow:

the first video analyzer application to perform a fourth set of one or more analysis operations on the one or more second frames; and the first video analyzer application to construct the event information about the content of the one or more first and second frames based on the fourth and third sets of one or more analysis operations.

9. The volatile or non-volatile storage device of claim 8, wherein:

the one or more first frames originated from a first camera at a first time, and the one or more second frames originated from the first camera at a second time that is different than the first time.

10. The volatile or non-volatile storage device of claim 8, wherein:

the one or more first frames originated from a first camera, and the one or more second frames originated from a second camera that is different than the first camera.

11. The volatile or non-volatile storage device of claim 8, wherein:

the instructions include additional instructions which, when executed by the one or more processors, further cause storing the event information in a data repository; and providing the one or more second frames includes providing the one or more second frames to the first video analyzer application to allow the first video analyzer application to construct event information that includes references to locations in persistent memory at which the one or more first frames and the one or more second frames are stored.

12. The volatile or non-volatile storage device of claim 8, wherein:

the instructions include additional instructions which, when executed by one or more processors, further cause storing the event information in a data repository; and wherein storing in a data repository includes storing the event information in one or more database tables.

13. The volatile or non-volatile storage device of claim 8, wherein the third set of one or more analysis operations is a first set of one or more on-the-fly analysis operations and the fourth set of one or more analysis operations are a second set of one or more on-the-fly analysis operations.

14. The volatile or non-volatile storage device of claim 8, wherein the one or more first and second frames are queued in a buffer.

15. The volatile or non-volatile storage device of claim 8, wherein the one or more first frames are from a first group of frames and the one or more second frames are from a second group of frames that is different than the first group of frames.

16. The volatile or non-volatile storage device of claim 1, wherein the event information includes pointers to locations in persistent memory at which the one or more first frames and the one or more second frames are stored.

17. The volatile or non-volatile storage device of claim 1, wherein the event information includes a start time and an end time of each of the one or more first frames and the one or more second frames.

18. The volatile or non-volatile storage device of claim 1, wherein the event information that includes references to locations in persistent memory at which a first group of frames that contains the one or more first frames and a second group of frames that contains the one or more second frames are stored.

19. The volatile or non-volatile storage device of claim 18, wherein the first group of frames is a different group than the second group of frames.

20. The volatile or non-volatile storage device of claim 1, wherein the step of providing the second analytic information includes providing the second analytic information to the first video analyzer application to allow the first video analyzer application to construct the event information in response to occurrence of an event that is external to the first and second video data.

21. The volatile or non-volatile storage device of claim 1, wherein the first set of one or more analysis operations is a first set of one or more on-the-fly analysis operations and the second set of one or more analysis operations is a second set of one or more on-the-fly analysis operations.

22. The volatile or non-volatile storage device of claim 1, wherein the first and second analytic information are queued in a buffer.

23. The volatile or non-volatile storage device of claim 1, wherein the one or more first and second frames correspond to surveillance video streams.

24. The volatile or non-volatile storage device of claim 1, wherein the one or more first frames are from a first group of frames and the one or more second frames are from a second group of frames that is different than the first group of frames.

25. A system for analyzing video data that represents one or more video streams, the system comprising:
 means for reading, from a memory, first analytic information that is associated with first video data and second analytic information that is associated with second video data;
 wherein the first video data includes (a) one or more first frames that correspond to a first video stream and (b) the first analytic information;
 wherein the second video data includes (a) one or more second frames that correspond to a second video stream and (b) the second analytic information;
 wherein the first analytic information is (i) about the content of the one or more first frames and describes the content of the one or more first frames, (ii) based on prior analysis of the one or more first frames, and (iii) different than the one or more first frames;
 wherein the second analytic information is (i) about the content of the one or more second frames and describes the content of the one or more second frames, (ii) based on prior analysis of the one or more second frames, and (iii) different than the one or more second frames;
 wherein the one or more second frames are different than the one or more first frames;
 means for performing a first set of one or more analysis operations on the first analytic information and performing a second set of one or more analysis operations on the second analytic information;
 means for constructing event information about the content of the one or more first and second frames based on both the first analysis information and the second analytic information;
 wherein the second analytic information differs from the first analytic information;
 means for storing the event information in a data repository.

26. The system of claim 25, further comprising:
 means for performing a third set of one or more analysis operations on the one or more first frames and performing a fourth set of one or more analysis operations on the one or more second frames; and
 means for constructing the event information about the content of the one or more first frames and the one or more second frames based on the third set of one or more analysis operations and the fourth set of one or more analysis operations.

27. A method performed by one or more processors for analyzing video data that represents one or more video streams, the method comprising the steps of:
 reading, from a memory, video data that includes first video data and second video data;
 wherein the first video data includes first analytic information about one or more first frames that correspond to a first video stream;
 wherein the first analytic information is (i) about the content of the one or more first frames and describes the content of the one or more first frames, (ii) based on prior analysis of the one or more first frames, and (iii) different than the one or more first frames;
 wherein the second video data includes second analytic information about one or more second frames that correspond to a second video stream;
 wherein the second analytic information is (i) about the content of the one or more second frames and describes the content of the one or more second frames, (ii) based on prior analysis of the one or more second frames, and (iii) different than the one or more second frames;
 performing a first set of one or more analysis operations on the first analytic information;
 performing a second set of one or more analysis operations on the second analytic information;
 constructing event information about the content of the one or more first and second frames based on the first set of one or more analysis operations on the first analytic information and the second set of one or more analysis operations on the second analytic information;
 wherein the second analytic information differs from the first analytic information;
 wherein the steps are performed by the one or more computing devices processors.

28. The method of claim 27, wherein:
 the one or more first frames originated from a first camera at a first time; and
 the one or more second frames originated from the first camera at a second time that is different than the first time.

29. A volatile or non-volatile storage device storing one or more sequences of instructions which, when executed by one or more processors, causes the one or more processors to perform the method recited in claim 28.

30. The method of claim 27, wherein:
 the one or more first frames originated from a first camera; and
 the one or more second frames originated from a second camera that is different than the first camera.

31. A volatile or non-volatile storage device storing one or more sequences of instructions which, when executed by one or more processors, causes the one or more processors to perform the method recited in claim 30.

32. The method of claim 27, wherein the step of constructing includes constructing event information that includes pointers to locations in persistent memory at which the one or more first and second frames are stored.

33. A volatile or non-volatile storage device storing one or more sequences of instructions which, when executed by one or more processors, causes the one or more processors to perform the method recited in claim 32.

34. The method of claim 27, wherein the step of constructing includes constructing event information that includes references to locations in persistent memory at which a first group of frames that contains the one or more first frames and a second group of frames that contains the one or more second frames are stored.

35. A volatile or non-volatile storage device storing one or more sequences of instructions which, when executed by one or more processors, causes the one or more processors to perform the method recited in claim 34.

36. The method of claim 27, wherein the step of constructing includes construction first event information for storage in a data repository, the method further comprising:
   retrieving the first event information from the data repository;
   adding second event information to the first event information, wherein the second event information further describes the content of the one or more first and second frames; and
   outputting the first and second event information for storage as an entry in the data repository.

37. A volatile or non-volatile storage device storing one or more sequences of instructions which, when executed by one or more processors, causes the one or more processors to perform the method recited in claim 36.

38. The method of claim 27, wherein the step of constructing includes constructing event information about the content of the one or more first frames and the one or more second frames in response to occurrence of an event that is external to the video data.

39. A volatile or non-volatile storage device storing one or more sequences of instructions which, when executed by one or more processors, causes the one or more processors to perform the method recited in claim 38.

40. The method of claim 27, wherein the steps of performing include:
   performing a first set of one or more on-the-fly analysis operations on the first video data; and
   performing a second set of on-the-fly one or more analysis operations on the second video data.

41. A volatile or non-volatile storage device storing one or more sequences of instructions which, when executed by one or more processors, causes the one or more processors to perform the method recited in claim 40.

42. The method of claim 27, wherein the step of reading includes reading from a buffer.

43. A volatile or non-volatile storage device storing one or more sequences of instructions which, when executed by one or more processors, causes the one or more processors to perform the method recited in claim 42.

44. The method of claim 27,
   wherein the steps of reading and performing include reading and performing the first and second set of one or more analysis operations on the first and second analytic information that correspond to surveillance video streams; and
   wherein the step of constructing includes constructing event information about the content of the frames that correspond to the surveillance video streams.

45. A volatile or non-volatile storage device storing one or more sequences of instructions which, when executed by one or more processors, causes the one or more processors to perform the method recited in claim 44.

46. A volatile or non-volatile storage device storing one or more sequences of instructions which, when executed by one or more processors, causes the one or more processors to perform the method recited in claim 27.

* * * * *

UNITED STATES PATENT AND TRADEMARK OFFICE
CERTIFICATE OF CORRECTION

| | | |
|---|---|---|
| PATENT NO. | : 7,667,732 B1 | Page 1 of 1 |
| APPLICATION NO. | : 10/965676 | |
| DATED | : February 23, 2010 | |
| INVENTOR(S) | : J. Andrew Freeman et al. | |

It is certified that error appears in the above-identified patent and that said Letters Patent is hereby corrected as shown below:

Column 17
Claim 5, Line 35, delete "third video analyzer" and insert --first video analyzer--.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,667,732 B1 | Page 1 of 1 |
| APPLICATION NO. | : 10/965676 | |
| DATED | : February 23, 2010 | |
| INVENTOR(S) | : J. Andrew Freeman et al. | |

It is certified that error appears in the above-identified patent and that said Letters Patent is hereby corrected as shown below:

Column 19
Claim 25: Line 57, delete "analysis" and insert --analytic--.

Column 20
Claim 27: Lines 38-39, delete "computing devices".

Signed and Sealed this

Twenty-ninth Day of March, 2011

David J. Kappos
*Director of the United States Patent and Trademark Office*